United States Patent [19]

Andrews et al.

[11] 4,103,789

[45] Aug. 1, 1978

[54] UNITIZED LOADING SYSTEM

[75] Inventors: Richard E. Andrews; Ira D. Hooker, both of Arvada; Daniel R. Simons, Evergreen, all of Colo.

[73] Assignee: Adolph Coors Company, Golden, Colo.

[21] Appl. No.: 781,539

[22] Filed: Mar. 28, 1977

[51] Int. Cl.² .............................................. B65G 67/04
[52] U.S. Cl. ................................ 214/41 R; 214/1 BE
[58] Field of Search ..................... 214/38 C, 41, 1 BE

[56] References Cited

U.S. PATENT DOCUMENTS

| | | | |
|---|---|---|---|
| 3,272,359 | 9/1966 | Thomas et al. | 214/1 BE X |
| 3,727,777 | 4/1973 | Hanson | 214/41 |
| 3,819,068 | 6/1974 | Weir | 214/38 C |

*Primary Examiner*—Robert G. Sheridan
*Attorney, Agent, or Firm*—Kyle W. Rost

[57] ABSTRACT

A unitized loader has a structural framework supporting a plurality of air bearings on its upper surface and on its lower surface, the upper air bearings supporting cargo on the loader and the lower bearings supporting the loader on the floor, the structural framework delivering air to both upper and lower bearings from a blower mounted on the framework. A pusher is movably mounted on the framework to index or discharge the cargo, and the upper air bearings are designed to provide greater lift along the sides of the loader to naturally compact cargo. Loader motion is controlled by a belt and chain system, the belt forming a pathway under the lower air bearings during loader extension and the chain connected by a driven sprocket to a drive motor on the loader framework, the belt and chain forming a loop with one point connected to the floor under the loader. The discharge end of the loader may be equipped with a ramp-like articulating section for guiding cargo to floor level. A photo-electric eye system by automatically control loading and discharge of cargo, and a transfer pusher may collect cargo in convenient unit sizes for delivery to the unitized loader.

15 Claims, 8 Drawing Figures

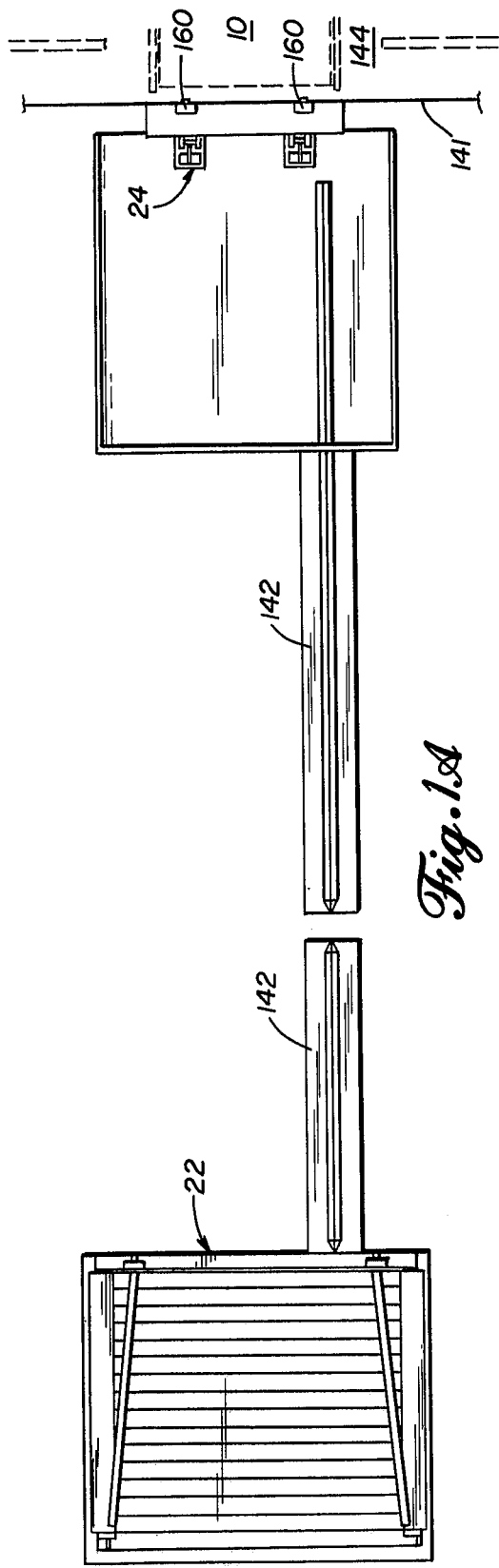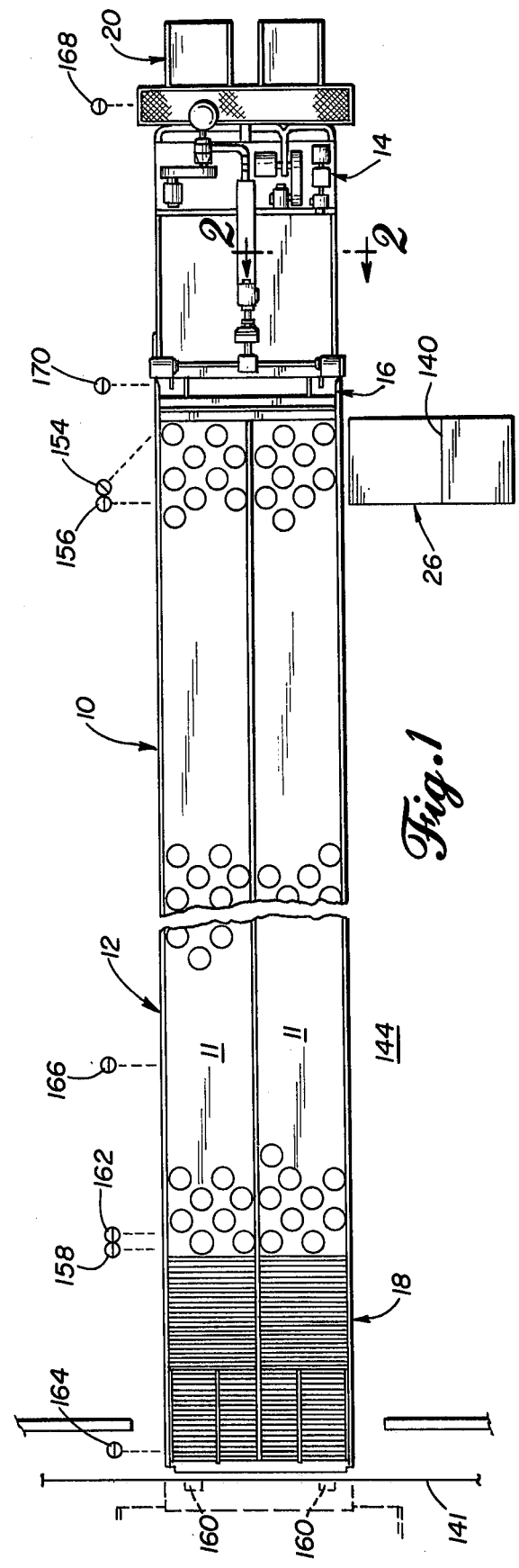

Fig. 2

UNITIZED LOADING SYSTEM

BACKGROUND OF THE INVENTION

1. Field of the Invention

The invention relates to vehicles for loading trucks, railroad cars or the like. The invention also relates to material and article handling systems. More specifically, the invention is an air-bearing-supported unitized loading system.

2. Description of the Prior Art

The air bearing and its use for transporting loads on a thin film of air is well known in the prior art. Patents such as U.S. Pat. No. 3,826,329 to Crimmins et al. and U.S. Pat. No. 3,831,708 to Terry have described improved versions of the air bearing and attempted to devise train-like systems for moving cargo across a warehouse or across uneven terrain. Yet, the scope of these and other known structures using air bearings is limited to small scale loading as was previously reserved for lift trucks and hand carts. No structure has successfully applied air bearings to truly novel and previously unaccomplished tasks such as loading an entire railroad car or truck trailer with a single preassembled load.

While some air bearing structures allegedly can traverse an uneven floor surface, some surfaces are so uneven as to stop any known air bearing. For example, some refrigerated truck trailers have ribbed floors for allowing cool air to circulate around the load, and the gap between a warehouse dock and a truck to be loaded is often too wide for an air bearing to float over. Such nonuniform surfaces have prevented air bearings from replacing conventional wheel-supported loading means in many situations.

Loading cargo in trucks, railroad cars, and the like has always been a slow job that generally required numerous trips by a fork-lift bringing cargo to the vehicle and arranging the cargo for a compact load. Attempts to quicken the loading process have led to shipping truck trailers on railroad flat cars, but this system requires two vehicles to carry a single load. Thus, no satisfactory system is known for loading an entire truck or the like with cargo in a single rapid operation. The present invention solves the above problems of air bearings and unitized loading systems.

SUMMARY OF THE INVENTION

A unitized loader has an upper and lower surface with independently actuated fluid bearings, the upper surface bearings supporting cargo and the lower surface bearings supporting the entire loader and cargo load for movement. Drive means controls the movement of the loader by acting on an elongated member such as a chain that is connected to a wide belt that is laid in a pathway for the lower air bearings to traverse discontinuities in the floor. A pusher acts along the length of the loader to index cargo being loaded onto the loader and to compact the cargo as it is unloaded into a vehicle in a single operation, the loader retracting from under the cargo while the pusher advances, a speed differential between the rate of loader retraction and pusher advancement assuring a compacted load. Fluid couplings in the drive trains for the pusher and the drive means, respectively, allow the speed differential to operate successfully. The forward end of the loader may be equipped with an articulating front transition section for maintaining floor contact and preventing damage to cargo being unloaded. The transition section may also contain an articulating front belt roller for assuring belt contact with the floor and keeping the front fluid bearings inflated.

An object of the invention is to create a unitized loader that is especially suited to handle cargo on flexible pullsheets. One approach to rapid loading of trucks is to crate cargo in large boxes or on rigid pallets that can be moved into the truck by fork lift or on a dolly. Such packing takes considerable space in the truck and makes unloading a small portion of the load difficult. Goods packed on flexible pull-sheets can be easily unloaded in small quantities by fork-lift, but pull-sheets do not lend themselves to bulk loading operations in the prior art. The fluid bearings on the present invention work well with cargo packed on a relatively smooth and uniform surface contacting the bearing surface. Plastic pull-sheets are useful to separate and protect parts of a load in any loading system, but they are especially suited for use in a system using fluid bearings against the pull-sheets.

An important object is to create a loader that can load an entire truck or similar vehicle in a single operation. By having both top and bottom air bearings, the loader can selectively float the cargo on the top surface, float the entire loader on the bottom surface, or do both together. The loader can insert a large and heavy cargo load into a truck and extract itself from under the load by operating both the top and bottom fluid bearings together.

A further object is to create a fluid bearing loader that can naturally compact loads floated on its surface. The use of small center bearing washers on the outside of the loader's upper surface and larger center bearing washers to the center of the upper surface compacts a load placed on the upper surface through the greater lift provided by the bearings having the smaller washers. Thus, loads tend toward the center of the surface.

A further important object is to provide a pusher and a loader retraction drive that operate at a speed differential to assure a compacted load. The pusher urges the load forward more rapidly than the underlying loader can retract, thus supplying constant pressure to compact the load. Fluid couplings in the pusher drive and retraction drive accomodate the speed differential without harm to the cargo or loader.

Another object is to provide loader drive means that allow for loader float and alignment. When the loader operates on its bottom side fluid bearings, it is subject to float and must be controlled by means that will not interfere with the low friction of the loader. By pulling itself along a chain by sprocket drive, the loader follows a consistent path and maintains alignment with the loading dock while not increasing friction, as would happen with the use of guide rails or tracks bordering the loader's path.

Another important object is to avoid the need for special ductwork supplying air to air bearings in the loader. Ductwork adds weight to the loader and is subject to leaks and resulting inefficient use of air. By using the structural members of the loader to transmit air to the bearings, stronger and less leak-prone ductwork is available without an increase in loader weight or size.

BRIEF DESCRIPTION OF THE DRAWINGS

FIG. 1 is a plan view of the unitized loader in retracted position at a loading dock and shows the major structural features of the loader and associated equipment.

FIG. 1A is a plan view of a truck trailer centering and leveling device for use immediately outside the loading dock of FIG. 1.

FIG. 2 is an enlarged vertical sectional view of the loader through the pusher, taken along the plane of line 2—2 in FIG. 1.

DESCRIPTION OF THE PREFERRED EMBODIMENT

Figure 3:
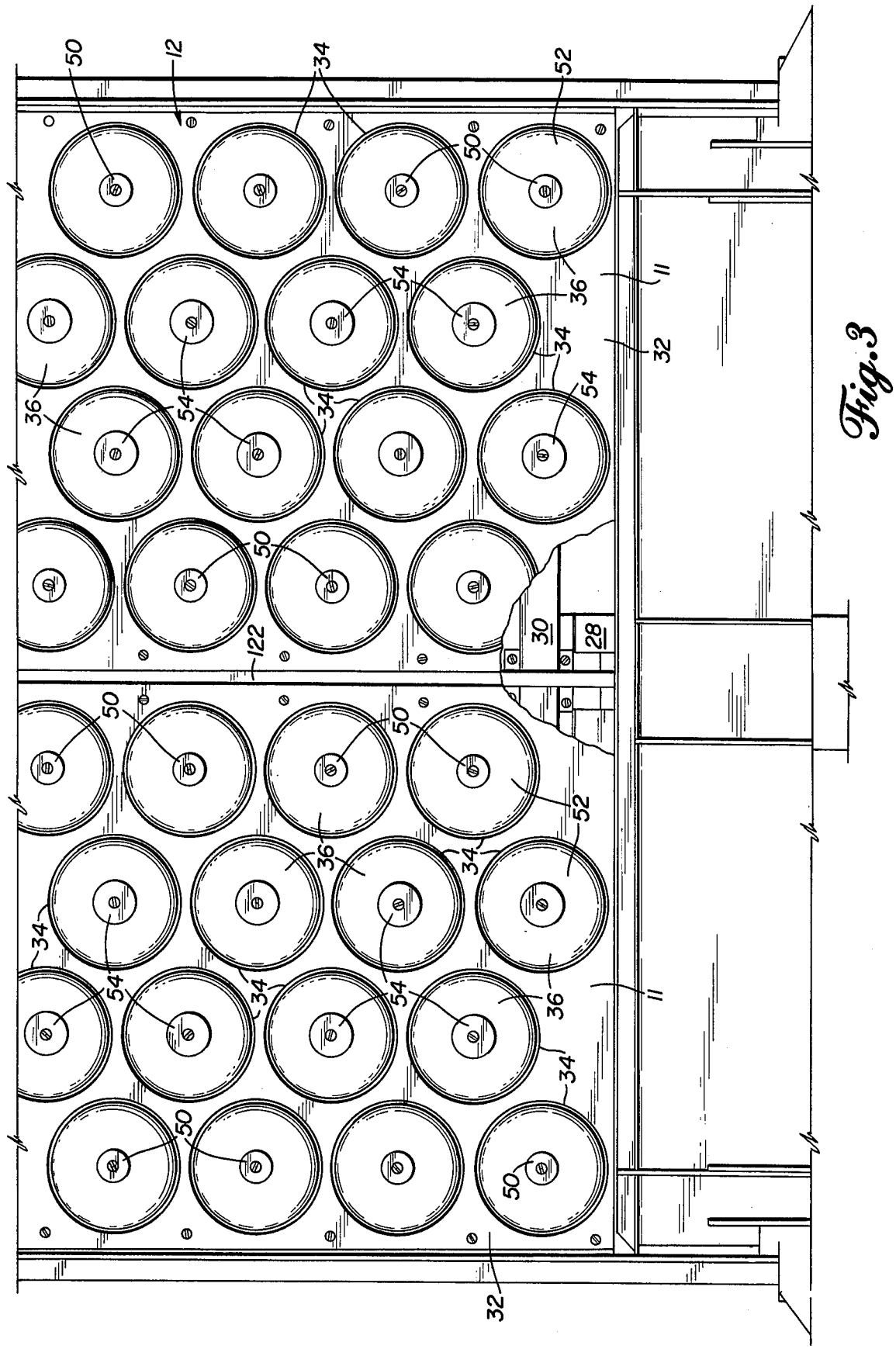
FIG. 3 is a plan view of a portion of the upper surface of the loader containing air bearings.

The unitized loading system illustrated in the drawings anticipates the use of air bearings floating a loader and its cargo while loading a truck trailer. The term "air bearing" will be used throughout, although it is anticipated that other fluids, including liquids, could be used in the appropriate situation. For example, in a marine application loading cargo on barges, water might prove a more appropriate fluid for use in the bearings. Hence, fluid bearings of any type could be used in place of the air bearings herein described.

The preferred embodiment of the loader will refer to a device of a size suited to load a truck trailer in a single operation. The loader is preferably custom designed for the type of vehicle with which it will operate, and the resulting configuration may vary accordingly. The unitized loader 10 of FIG. 1 has two lanes 11, each the mirror image of the other, and the advantages of a loader having this structure will be pointed out, although a single lane could be used with obvious modification for the appropriate size of vehicle being loaded.

The main components of the loader are a central load-bearing area 12, a rear utility area 14, a load pusher 16 movably mounted on the loader, a front transition section 18 maintaining floor contact for preventing damage to the load as it is unloaded, and a drive system 20 underlying the loader for controlling loader motion and providing a smooth travel surface. Associated equipment especially useful with truck trailers is trailer centering device 22 and trailer leveling device 24 shown in FIG. 1A, modifications of which may be applied to railroad cars and other vehicles. Transfer pusher 26 is useful for transfering small units of cargo onto loader 10.

Figure 2:
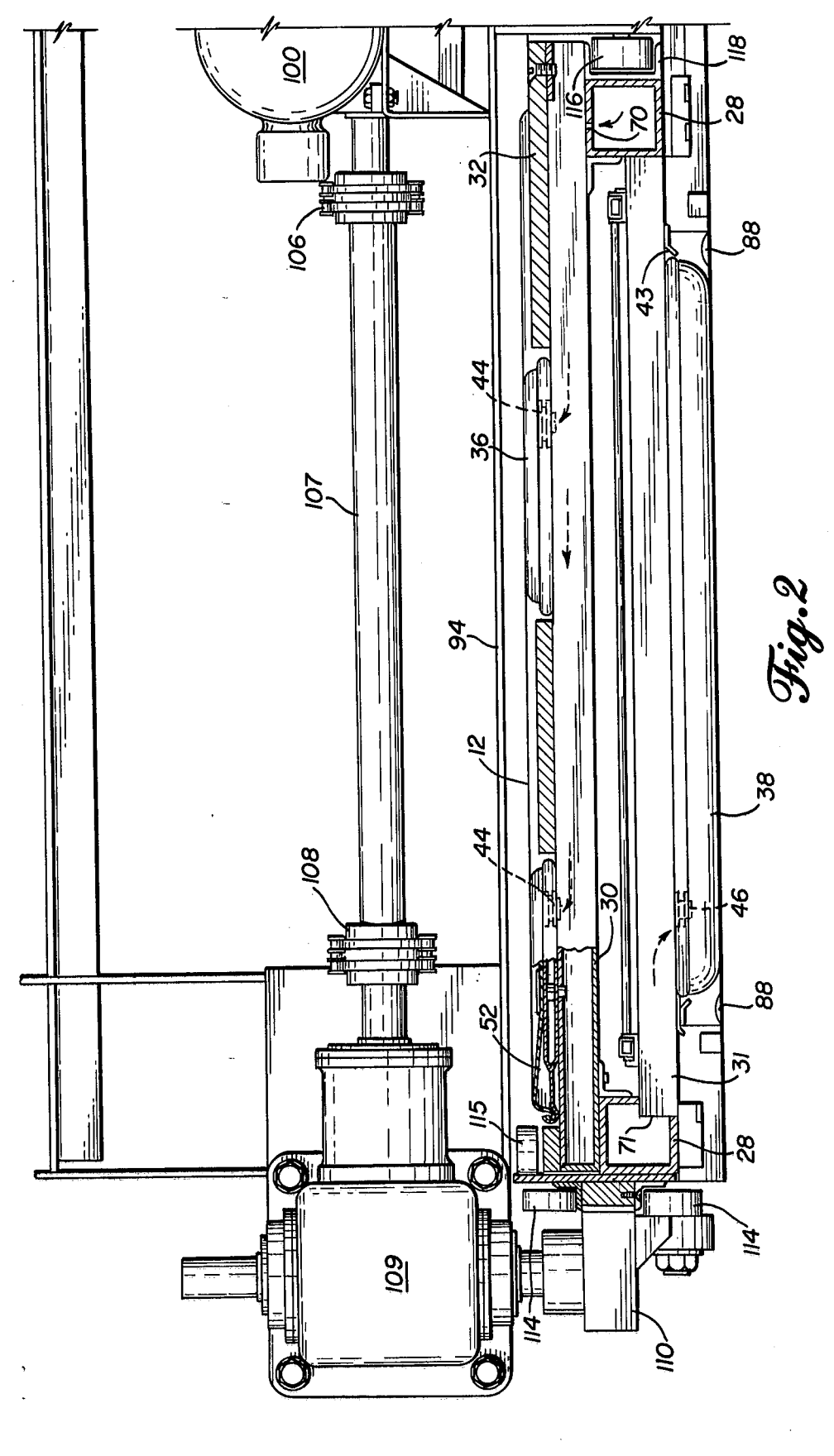

Load-bearing area 12 is supported on a strong framework which includes longitudinal frame members 28, for example four members formed from square tubing and having one member running along the longitudinal sides of each lane 11 of FIG. 1, as best shown for a single lane in FIG. 2. A plurality of transverse stringers 30 and 31 are connected to frame members 28 and provide support between the frame members 28. Stringers 30 are attached across the top of members 28 and support deck 32, which may be formed of plywood with a laminated plastic coating on its upper surface for low sliding friction. Deck 32 has a plurality of openings 34 in its structure, each opening adapted to fit around a top side air bearing 36, and the pattern of openings 34 and air bearings 36 being in a nested configuration as shown in FIG. 3 for providing a high density of air bearings per unit of deck surface area. Each air bearing 36 is mounted on at least one stringer 30 for support, each stringer 30 supporting the deck and air bearings under a single lane of load-bearing area 12.

The lower side of load-bearing area 12 is strengthened by stringers 31, whose lower side is on a plane parallel with the plane of the lower side of frame members 28, as shown in FIG. 2. Bottom side air bearings 38 are supported on stringers 31, for example on three stringers 31 supporting each bearing, and plates 40 fill the area between stringers 31 for additional support for the bottom side air bearings. The bearings 38 may be held in place by such means as are required, for example by index bar 42 and clip 43 in FIGS. 4 and 2, respectively. Bearings 38 are relatively larger than top bearings 36 and may be arranged in rows, one row under each lane 11.

Air bearings 36 and 38 are known in the prior art and are composed of a backing plate and a rubber face, the center of the rubber face being attached to the backing plate by a washer and cap screw. The backing plate has an intake orifice for admitting air into the bearing, and the rubber face has an orifice for discharging the air. When the face and discharge orifice are covered by a load, the bearing inflates and creates a dished area in its center where the face is connected to the backing plate. Air enters the dished center from the discharge orifice and floats the load on a cushion of air. The size of the bearing is related to the size of the surface it will act against, and accordingly lower bearings 38 are larger since they act against the floor, while bearings 36 will act against smaller loads resting, for example, on pull-sheets.

The supply of air to top side air bearings 36 travels through selected longitudinal members 28 and then through stringers 30, as shown by the arrows in FIG. 2. Air to the bottom side air bearings 38 travels through members 28 and at least one stringer 31 supporting each bearing. Top air bearing orifice 44 and bottom air bearing orifice 46 connect the stringers with their respectively mounted air bearings.

On most flat surfaces, a stack of cargo depends on compactness in its original stacking to create a firmly packed load. A load being moved on a dolly or other conveyor often is strapped together to maintain compactness during travel. The load-bearing surface shown in FIG. 3 incorporates means for compacting the load as it rests on top side air bearings 36. Each lane 11, FIGS. 1 and 3, is of convenient width to receive a single module of cargo, as will be described in connection with transfer pusher 26 below. The bearings running longitudinally along the sides of each lane are equipped with washers 50 holding the center of rubber bearing face 52 against the backing plate, as above described. The remaining bearings, centrally located on each lane, are equipped with washers 54 in place of washers 50, washers 54 having a relatively larger diameter than washers 50 and accordingly holding slightly more of rubber face 52 against the backing plate of the bearing. As a result of the washer size variation, the bearings at the sides of each lane have more lift than do the bearings in the center of each lane, and a load resting on the full width of the lane will settle toward the center of the lane and be naturally compacted without the need of straps or other aids.

Similarly, loads on a lane will tend not to shift laterally to the adjacent lane, but can easily be moved longitudinally along a lane. The variation in relative lift described above could be achieved in other ways such as mounting the bearings at slightly different heights.

Figure 5:
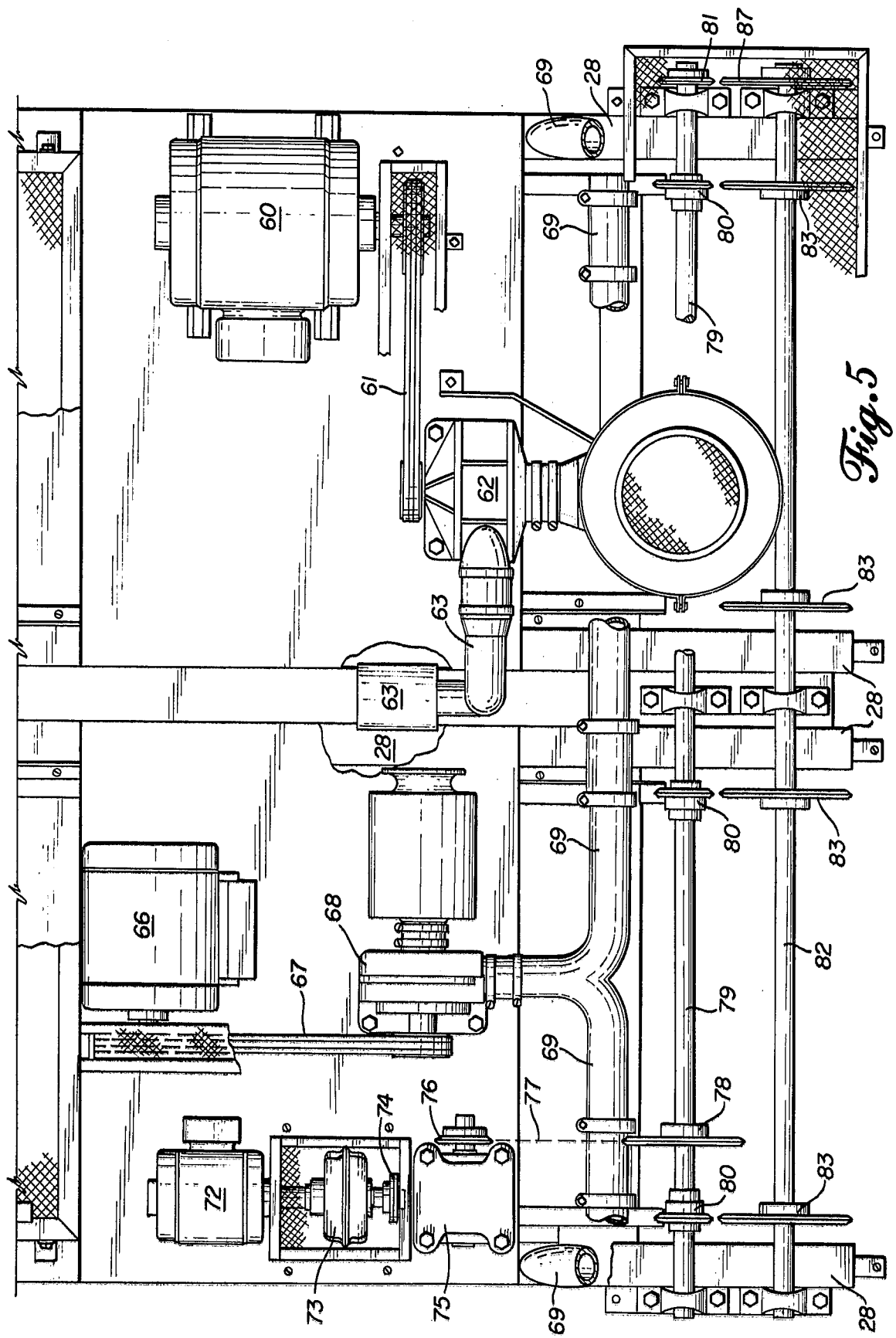
FIG. 5 is a plan view of the utility area at the rear end of the loader.

Means for inflating the air bearings and moving the entire unitized loader 10 are attached to the loader framework at the rear utility area 14. As best shown in FIG. 5, an electric motor 60 provides the power for inflating the top side air bearings 36. Motor 60 is connected, for example by belt drive 61, to blower 62, which in turn supplies air through manifold 63 to selected frame members 28, for example to the central two frame members. If desired, two blowers 62 may be used to provide a greater quantity of air to the top side air bearings. A motor having fifty horsepower at 3600 rpm has been found to be sufficient for the described embodiment of the invention. The bottom air bearings are inflated by a separate motor 66 connected, for example by a belt drive 67, to blower 68, which in turn supplies air through manifold 69 to selected frame members distinct from those mentioned above, for example to members 28 on the longitudinal sides of the loader 10. Motor 66 may have ten horsepower at 3600 rpm. The described arrangement of separate motors and separate manifolds leading to center and side members 28, respectively, allows the top air bearings to be inflated independently of the bottom air bearings and vice versa, or both to be inflated at the same time. Accordingly, stringers 30 upon which the top air bearings are mounted are connected by orifices 70 to the central frame members 28, while stringers 31 through which the bottom side air bearings receive air are openly joined at 71 to the side frame members 28 of loader 10.

Figure 6:
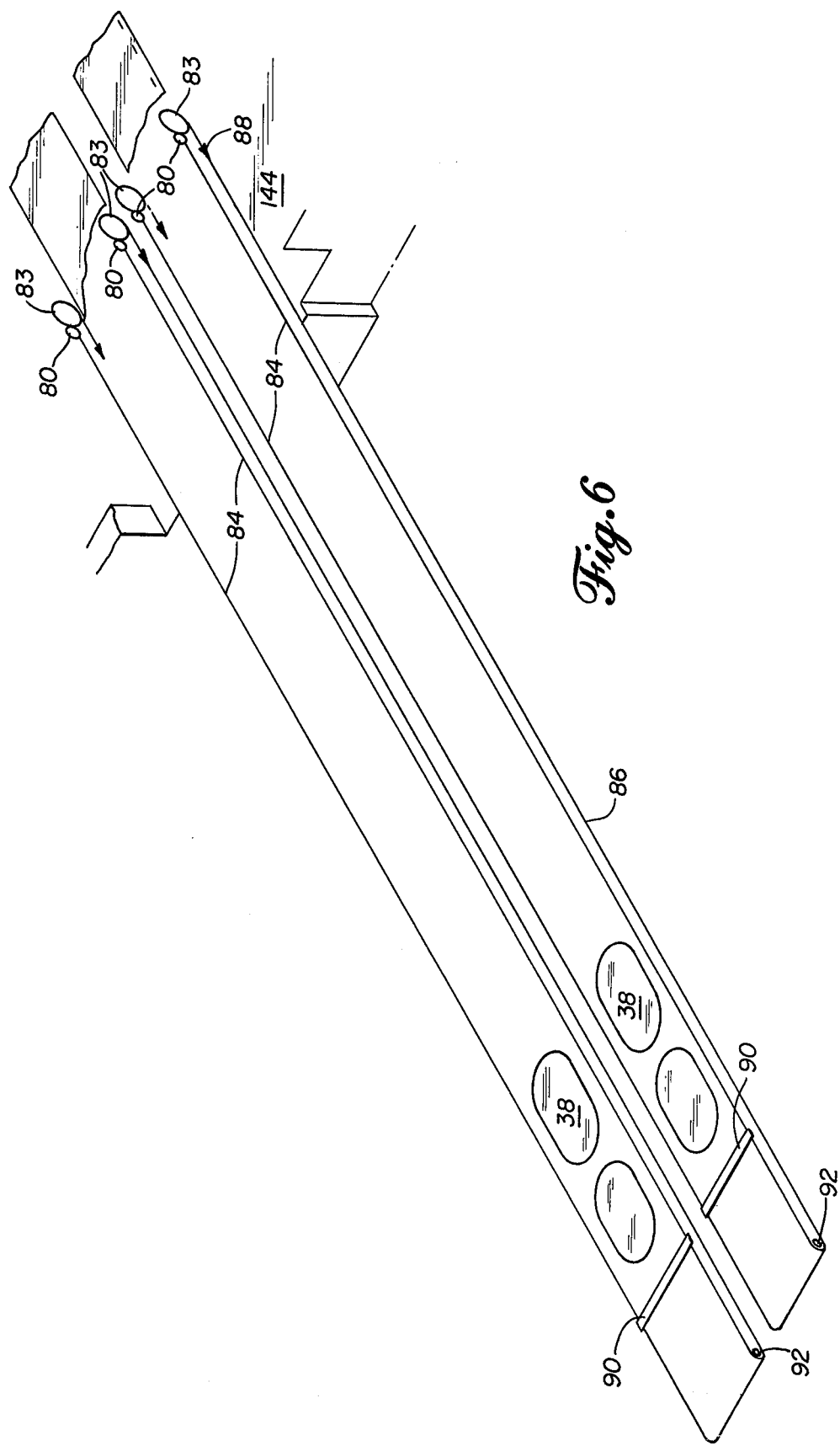
FIG. 6 is a perspective view of the extension and retraction chain and belt system as it appears when the loader is extending from its dock into a vehicle.

When the loader is moved, the bottom side air bearings 38 are inflated, and the motion of the loader on the air bearings is controlled by extension and retraction means such as a belt and chain system 20, powered by extension and retraction motor 72 mounted in utility area 14. Motor 72 may transmit power via fluid coupling 73 to flexible coupling 74 and in turn to gear reducer 75, which rotates sprocket wheel 76 to drive roller chain 77, inturn driving sprocket wheel 78 keyed to shaft 79, which supports idler sprockets 80 and is keyed to sprocket 81. A shaft 82 is mounted on utility area 14 parallel to shaft 79 and has drive sprockets 83 keyed thereto, each sprocket 83 being opposite a corresponding idler sprocket 80. Each sprocket set 80, 83 engages a roller chain 84 connecting to a belt 86 that extends under the loader 10 when it is in operation. Shaft 82 also carries driven sprocket 87 keyed thereto opposite sprocket 81 on shaft 79, the rotation of sprocket 81 being transmitted through a roller chain (not shown) to turn shaft 82 and sprockets 83, which act directly on chain 84. As best shown in FIG. 6, chain 84 is substantially the length of loader 10 and runs from floor attachment 88 rearwardly at floor level to sprocket 83, then wraps around the majority of the circumference of sprocket 83 for good driving contact, passing up the rear side of the sprocket and down the front side and between sprockets 83 and 80, finally running under sprocket 80 and forward within the loader to connection 90 with belt 86. Belt 86 in turn runs forwardly around roller 92 near the front end of loader 10 and then at floor level rearwardly to floor attachment 88, and may continue under chain 84 to the rear end of the loader. Chain 84 and belt 86 form a loop that reciprocates with respect to attachment 88 as the loader extends and retracts in response to the driving action of motor 72 on chain 84, with connection 90 having relative motion with respect to the surface under loader 10 while attachment 88 is stationary. In the illustrated embodiment, each lane 11 has a belt 86 providing a surface under a row of bottom side air bearings 38 and a chain 84 connecting to each of the two outside corners of each belt end at connector 90.

Figure 4:
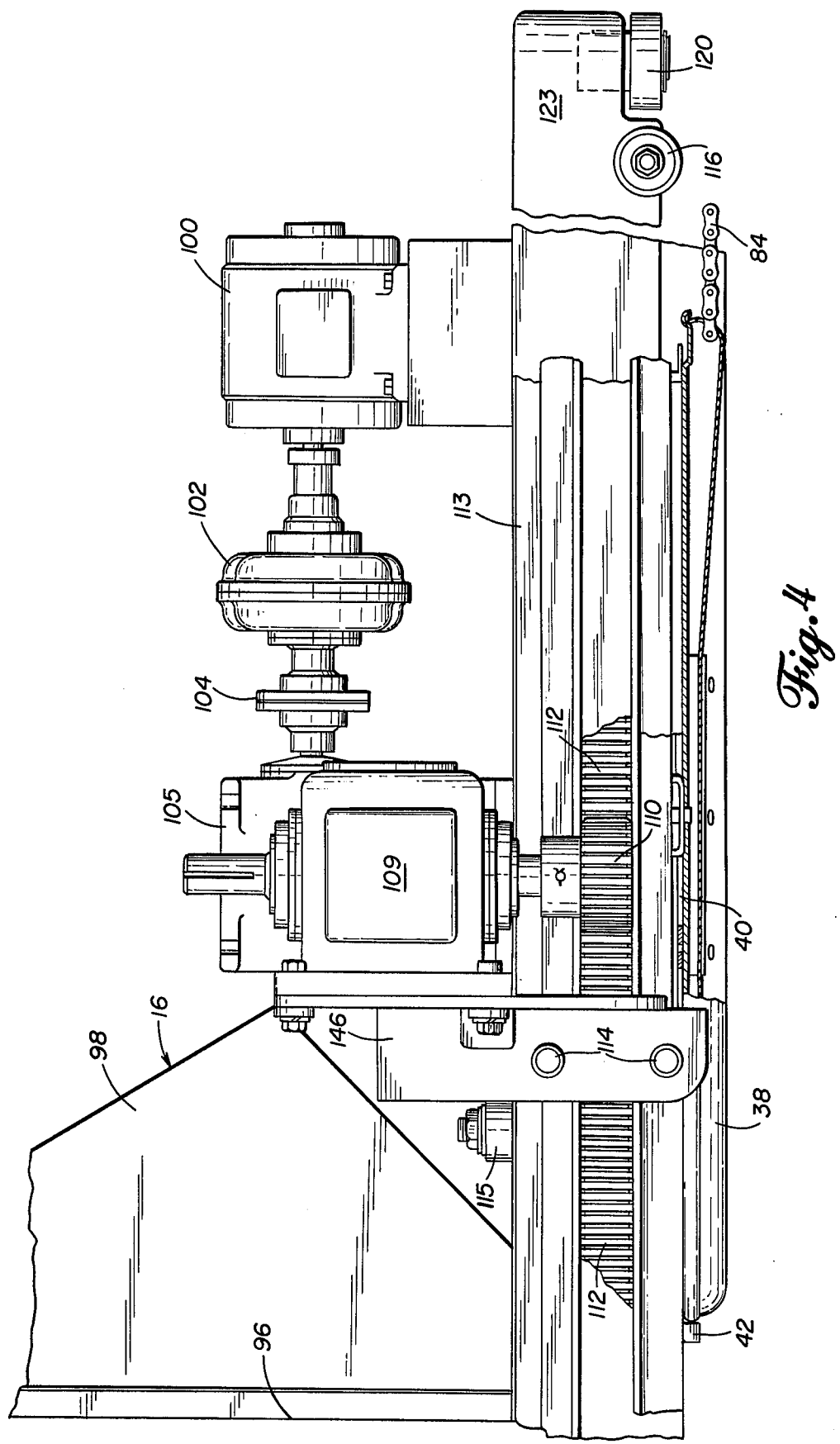
FIG. 4 is a side elevational view of the pusher.
Figure 7:
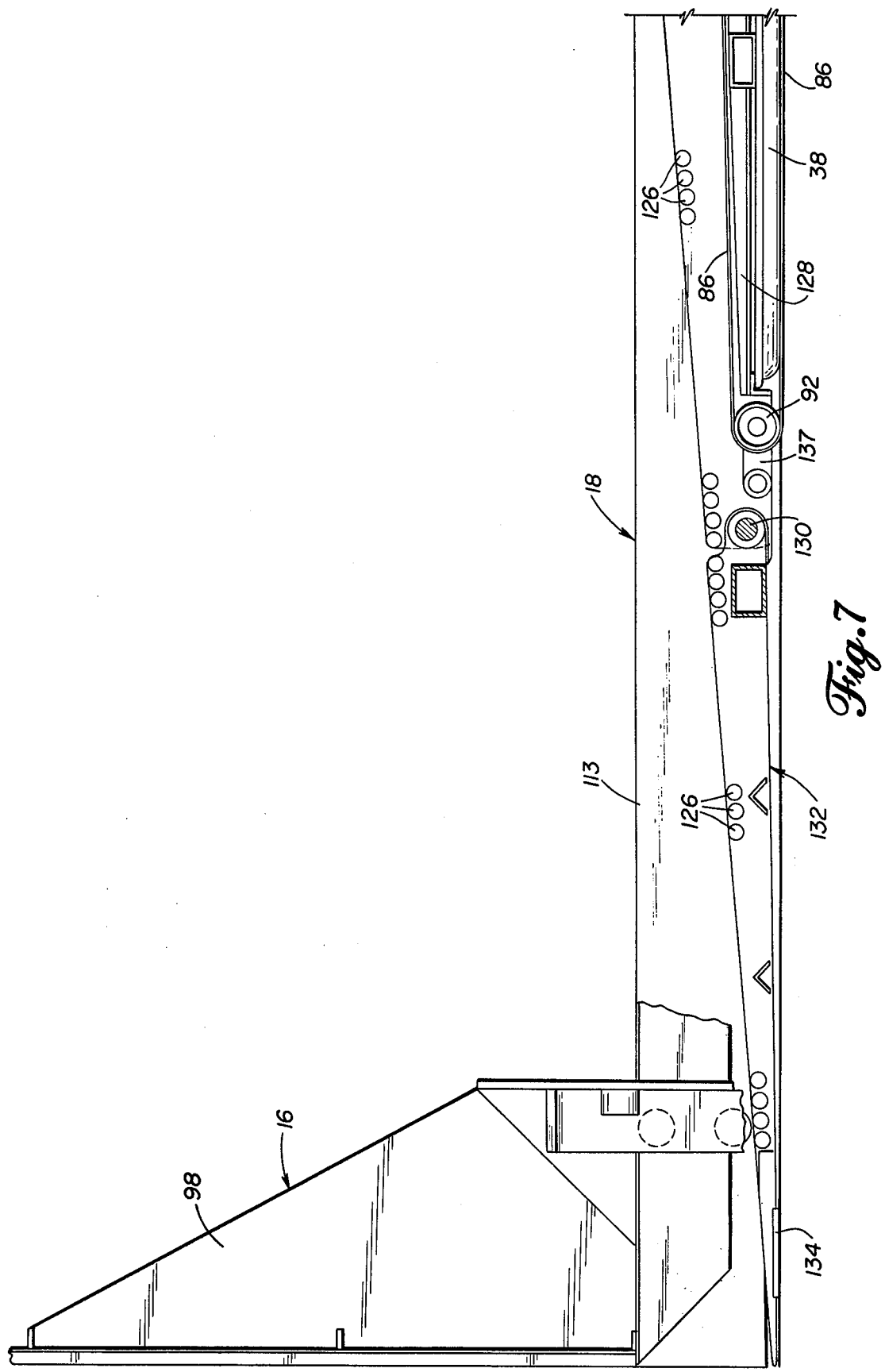
FIG. 7 is a side elevational view of the front transition section of the loader, also showing the position of the pusher at the forwardmost point of its travel.

Pusher 16 is mounted on a movable carriage 94 that is capable of traveling from a rearward position just in front of utility area 14 as shown in FIG. 1 to a forward position at the front end of transition section 18 as illustrated in FIG. 7. As shown in FIG. 4, the pusher has a substantially vertical pusher plate 96 for acting against cargo on the loader 10, and plate 96 is secured by suitable support members 98 to carriage 94. Means for pusher movement is provided by motor 100, producing for example, 2 horsepower at 3600 rpm. The power train may include fluid coupling 102 keyed to the motor shaft and connected by flexible coupling 104 to reducer 105. As best shown in FIG. 2, reducer 105 transmits power to each side of the loader through flexible coupling 106 to pusher drive shaft 107, in turn connecting via flexible coupling 108 to bevel gear box 109. Referring now to FIGS. 2 and 4, bevel gear box 109 provides power to pusher drive pinion 110, which engages rack 112 attached to side guide plates 113, FIG. 7, connected to the loader framework and running substantially the entire length of the loader. Pusher carriage 94 is further supported and guided by vertical guide wheels 114 acting above and below rack 112, horizontal guide wheels 115 acting against the inner wall of plate 113, and by pusher wheel 116 acting in central track 118, FIG. 2. Longitudinal alignment of the pusher as it travels along loader 10 is assured by horizontal pusher wheel 120, FIG. 4, also riding in track 118. The two lane design shown in the illustrated embodiment of the invention allows the pusher to be guided along a rack 112 on the outer side of each lane while track 118 is formed by the inner side of each lane. Gap 122 between the lanes 11 in deck 32, FIG. 3, allows carriage portion 123 to support the pusher plate along its central axis via wheels 116 and 120. The rearward disposition of carriage portion 123, FIG. 4, and its associated wheels allows the pusher plate 96 to travel to the forward edge of the loader 10, including transition section 18, while maintaining wheels 116 and 120 in a portion of the loader thick enough to contain track 118. Guide plates 113 continue to the forward end of transition section 18 and prevent the load from slipping sideways while being pushed off the front of the loader.

The purpose of front transition section 18 is to provide ramp means for easing the load from the height of load-bearing section 12 to floor level. Decreasing the height of the load-bearing surface requires modification of the frame structure, in this case the elimination of top side air bearings in the transition section and substitution of an inclined plane of rollers 126. In the illustrated embodiment of FIG. 7, a thin transition frame 128 provides needed structural support after longitudinal members 28 are terminated because of their thickness. Transition frame 128 supports, for example, one bottom side air bearing 38 for each lane of the loader and may carry the air supply for that bearing via a hose (not shown) from the appropriate member 28. Frame 128 decreases in thickness as it runs toward the forward end of the loader and terminates at a pivotal connection 130 to an articulating front section 132, which also has rollers 126 on its upper surface, but rides on a wear plate 134 on its lower front portion and provides constant ground contact at the front end of the loader.

Belt roller 92 is carried in the transition frame 128 forwardly of the bottom side air bearings 38 and supports belt 86 in its path between the upper and lower sides of air bearings 38. Because the bottom air bearings raise the loader by a small amount when they are inflated, for example by one-half inch, roller 92 must articulate in order to guide belt 86 at floor level when the bearings 38 are operating. If roller 92 remained, for example, one-half inch from the floor during the operation of bearings 38, the belt would cause front bearing 38, shown in FIG. 7, to partially collapse, seriously decreasing the underside air support during the loader movement. Accordingly, roller 92 is connected to frame 128 by a cantilevered linkage, for example by link 137 pivotally connected at its forwardmost end to frame 128 and at its rearward end to roller 92. The tension of belt 86 passing around roller 92 urges the roller to the lowest possible position for any condition of air bearing inflation, making the roller self-adjusting to floor level for any condition of the loader.

A transfer pusher 26, while not a direct part of the present loader, is a desired means for loading the loader. The transfer pusher may have a floor area of appropriate size to be easily loaded by a fork lift, the width of the floor being approximately the same as the width of one lane of the two lane loader. When the transfer pusher is fully loaded, a motor powered pusher 140 moves the cargo onto the first lane of loader 10 and then retracts to receive further cargo from a forklift or other device.

Another piece of desired associated equipment is trailer centering device 22, FIG. 1A, that directs a truck trailer in a precise path toward a loading dock 141 using the unitized loader 10. The wheels of the truck are directed along "V" track 142 until the trailer is against the dock. Then leveling device 24 jacks the trailer end to the level of the dock floor 144.

In operation transfer pusher 26 is loaded by any means and it in turn places the cargo on the load-bearing surface 12 while top air bearings 36 are operating. If the load is the width of a single lane of loader 10, the top side air bearing structure above described will dish the cargo, preventing the cargo from sliding into the second lane. When transfer pusher 26 supplies a second load, the first load will be pushed further across surface 12 and onto the second lane. At this point, pusher 16 is activated to index the cargo, now the full width of surface 12, pushing the cargo forward several feet and then returning to the position shown in FIG. 1, clearing the rear portion of surface 12 for additional loads from transfer pusher 26. In this way, the entire surface 12 is loaded, each lane dishing its cargo for stability. Only the top side air bearings need be in operation.

When a truck or other vehicle to be loaded arrives, it is aligned and leveled with the path of the loader 10, for example by the centering and leveling devices 22 and 24. When the vehicle is in place, the bottom side air bearings are energized through operation of motor 66 and blower 68. Extension and retraction motor 72 operates to turn shaft 82, causing sprockets 83 to drive chain 84 and extend the loader 10 into the vehicle to be loaded. Since chain 84 is attached to the floor of the dock at 88, when sprockets 83 draw chain 84 upwardly over the rear of the loader, the loader pulls itself forward. At the same time, belt 86 is drawn around roller 92 and under air bearings 38 as the loader advances, the belt being a smooth and uniform pathway over which the bearings operate with ease. The belt also helps smooth the path over any gap between dock 141 and the vehicle being loaded. Some vehicles, for example refrigerated truck trailers, have uneven floors, possibly having deep longitudinal grooves to allow circulation of air around the cargo. Any air bearing would find travel over such a surface difficult if not impossible, but with belt 86 providing a uniform pathway, the loader 10 has no difficulty on such surfaces. Because belt 86 and chain 84 form a closed loop, both being attached to the dock floor 144 at 88, the belt maintains a constant tension regardless of the speed with which chain 84 is operated, and hence the loader operates under the control of motor 72 at all times and does not coast. Supplemental strengthening means such as a cable may be attached to chain 84 at 90 and run parallel with the path of belt 86 to floor attachment 88, thereby making the closed loop from chain and cable and relieving excessive stress on belt 86.

When the loader has moved all of load-bearing surface 12 into the vehicle, the loader is stopped, or fluid drive 73 allows the loader to strike a stop of some kind without damage. Bevel gear boxes 109 in the pusher drive train extend beyond the sides of the loader and may have appropriate bumpers, for example plates 146, on their forward sides for striking the rear side walls of the vehicle being loaded. With the load fully inside the vehicle, the top side air bearings 36 are energized by motor 60 and blower 62, and while the bottom side air bearings 38 remain energized, load pusher 16 is driven forward through the action of motor 100 acting through fluid drive 102. At the same time, extension and retraction motor 72 operates to retract loader 10 from the vehicle body. The resulting action of motors 72 and 100 leaves the pusher in a substantially unchanging position at the loading door of the vehicle while the remainder of loader 10 appears to withdraw from under the pusher. In fact, pusher 16 is attempting to move forward and in so doing assists the loader in retraction, since plates 146 may strike the rear of the vehicle and will not allow the pusher to enter the vehicle. The pusher is geared to move faster than the loader itself so that it will remain at the entrance of the vehicle and continue to push the load forward over top air bearings 36 and down the roller ramp of transition section 18 to the floor of the vehicle. Fluid coupling 102 allows necessary slippage to accommodate the speed difference between the pusher and the loader. When the pusher has reached the forwardmost part of the loader as shown in FIG. 7, the entire load will have been deposited in the vehicle. The pusher then ceases forward motion and motor 100 reverses to return the pusher to its rearward position on the loader.

In a modified embodiment of loader 10, pusher 16 may be driven along an interior rack instead of rack 112, and gear boxes 109 and plates 146 need not extend beyond the sides of the loader. Such a configuration would allow pusher 16 to move entirely into the vehicle being loaded and if desired, discharge a part or entire load at any position in the vehicle, as dictated by appropriate controls.

Another modified embodiment may operate either with or without bumper means on pusher 16, the position and operation of the loader being controlled by a system of photo-electric eyes or equivalent means for detecting loader condition and position. As shown in FIG. 1, the photo eye system is arranged to automatically operate the loader to insert a full load into a truck trailer when the trailer is properly positioned at loading dock 141. Eye 154 indicates when a load has been placed on both lanes of the loader; eye 156 indicates when the pusher has indexed the load, advancing it one unit length; eye 158 indicates when the loader is fully loaded and ready to be inserted into the trailer, limit switches 160 on leveling device 24 indicating when a trailer is at the dock, level, and ready to receive the load; eye 162 indicates when the loader is in position to start the blower for the top air bearings 36 and being to extend the pusher 16; eye 164 indicates when the pusher is fully extended; eye 166 indicates when the loader is fully extended; eye 168 indicates when the loader is fully retracted; and eye 170 indicates when the pusher is fully retracted. This system of photo eyes may be connected via appropriate electrical switches to automatically control the extension and retraction of the loader and the pusher for loading the trailer, the extension and retraction of the pusher for indexing cargo on the loader, and the operation of the top and bottom side air bearings for moving the cargo on the loader and discharging the cargo in the trailer. The photo eyes indicate all important positions and conditions of loader 10 and obviate the need for bumper means on pusher 16 or for a mechanical stop on the loader 10 during extension. With obvious modification, the photo eye system could control pusher 16 in the modified embodiment wherein the pusher delivers a partial load inside the trailer.

A further modified embodiment of the loader 10 may substitute rollers for the plurality of upper air bearings 36, the rollers being in a configuration similar to a roller conveyor, well known in the prior art. The rollers may be similar to those shown for use with front transition section 18.

The preferred embodiment of loader 10 as described above delivers a load weighing 49,500 pounds, the entire unitized loader plus load weighing 68,000 pounds. From the time a truck is at the dock, centered and leveled, the loader requires approximately 5 minutes to deliver the full load. Thus, a truck can spend as little as, for example, ten minutes between arrival and departure at a dock using the unitized loader. The time-consuming task of accumulating the cargo on the loader may be accomplished regardless of whether a truck is present and at the convenience of the dock personnel.

We claim:

1. A unitized loader for receiving cargo in relatively small unit loads, indexing the unit loads into a compact total load, moving to extend its front at least partially into a hauling vehicle, delivering the total cargo load into the vehicle, and retracting from the vehicle into a position to receive additional unit loads of cargo, comprising:
    (a) a structural framework having fluid bearings supported on its top surface for floating said cargo units and having fluid bearings supported on its bottom surface for supporting the framework for motion on a fluid cushion during extension and retraction of the loader;
    (b) pusher means movable between the rear and front of the loader for a first distance for indexing said units of cargo toward the front of the loader into a compact load and for a second distance for pushing the entire load forward for delivering the cargo into the hauling vehicle;
    (c) extension and retraction means for moving the loader forward to deliver cargo into a vehicle and for moving the loader rearward in conjunction with the forward motion of said pusher for removing the loader from under the cargo and depositing the cargo in a compact load in the hauling vehicle; and
    (d) fluid bearing inflating means for selectively providing fluid to the top side and bottom side fluid bearings.

2. The loader of claim 1, wherein said top side fluid bearings define a longitudinal lane having a first group of bearings having relatively greater lift mounted in paths along the longitudinal sides of the lane and a second group of bearings having relatively lesser lift mounted in the intermediate area between said paths, the lift differential providing compacting of cargo units toward said intermediate area.

3. The loader of claim 2 for use with transfer means delivering unit loads the approximate width of said lane transversely onto said lane at the rearward end of the lane and in front of said pusher means, further comprising a plurality of lanes in parallel abuttment for receiving a unit load from said transfer means on a first lane and compacting the load toward the intermediate area of the first lane until a second unit load is received from the transfer means, pushing the first load onto the next adjacent lane.

4. The loader of claim 3, wherein said lanes run from front to rear of the loader and said pusher means further comprises a plate the width of the combined lanes for indexing the cargo loads when all lanes contain at least one cargo unit load, clearing the area immediately in front of the pusher to receive additional unit loads successively moved across the lanes by said transfer means.

5. The loader of claim 1, wherein said extension and retraction means operates at a first speed during retraction and comprises means for allowing slippage in the motion of the loader, and wherein said pusher means operates at a second speed during pushing operations and comprises means for allowing slippage in the motion of the pusher, and wherein said first speed is relatively slower than said second speed, the speed differential allowing interaction of the pusher and the extension and retraction means for compacting the cargo as it is discharged from the loader.

6. The loader of claim 1, wherein said extension and retraction means comprises:
    (a) a belt fastened to the floor underlying the loader at a point of the belt's length, said belt being at least the width of a bottom side fluid bearing for acting as a pathway for the bearing to travel upon and running forwardly under the bottom side fluid bearings at floor level before passing upward and rearwardly within the loader,
    (b) a chain anchored to the floor underlying the loader at a point in the chain's length and running rearwardly under the loader before passing upward and forwardly within the loader to a connection with said belt, the belt and chain forming a loop reciprocating with respect to the floor under the loader during extension and retraction of the loader, and
    (c) chain drive means attached to said lower and engaging the chain for creating the reciprocating motion and in turn causing the loader to extend and retract along a consistent path.

7. The loader of claim 6, wherein said belt extends at floor level for the entire length of the loader when the loader is in retracted position, a portion of said belt extending forwardly and a portion extending rearwardly of the fastening point of the belt to the floor for providing a uniform surface under bottom side air bearings along the entire length of the loader.

8. A unitized loader for inserting cargo into a truck, railroad car, or other large hauling vehicle, comprising:
(a) a structural framework defining a load-bearing surface of suitable size to at least partially enter said hauling vehicle, the framework having fluid bearings mounted on its top side and on its bottom side for floating cargo on the loader and floating the loader on the floor, respectively;
(b) a pusher movably connected to said framework for travel over the top side fluid bearings to push said cargo;
(c) means for moving the loader into an extended position at least partially entering the hauling vehicle to discharge cargo and into a retracted position outside of the vehicle;
(d) means for energizing said top and bottom side fluid bearings;
(e) means for moving said pusher along the load-bearing surface; and
(f) wherein said top side fluid bearings comprise a first group of bearings along the side edges of the loader and a second group of bearings intermediate the first group, the first group having means for providing a first amount of lift and the second group having means for providing a second amount of lift, the first amount of lift being greater than the second amount of lift, the lift differential providing compacting of cargo resting across the two groups of bearings.

9. The unitized loader of claim 8, wherein said pusher is connected to said means for moving the pusher by a drive train having means for allowing slippage, the slippage allowing the pusher to compact cargo without crushing the cargo.

10. The unitized loader of claim 9, wherein said means for moving the pusher comprises a motor having a drive train acting against the loader structural framework to move the pusher and wherein said means for allowing slippage comprises a fluid coupling in the drive train.

11. The unitized loader of claim 8, wherein said top side fluid bearings are of a single size and are of the type having a backing plate and a rubber face, the center of the face being fastened to the backing plate by means including a washer, and wherein the means for providing said first and second amounts of lift are, respectively, a relatively smaller washer on said first group of bearings and a relatively larger washer on said second group of bearings.

12. The loader of claim 8, having ramp means for gradually lowering cargo from said top side fluid bearings down an incline to the level of the surface underlying the loader, wherein said ramp means comprises a transition frame supported section connected to the front of said structural framework and a gravity controlled articulating section connected to the front of said transition frame supported section, the transition frame being rigidly connected to said structural framework and having transition frame members tapering in thickness from the structural framework toward the articulating section, the transition frame supported section having a fluid bearing on its bottom side for support during motion, and the articulating section having rollers on its top side and a wear plate on its bottom side providing contact between the floor and the transition frame supported section regardless or irregularities in floor height or degree of bottom side bearing inflation.

13. A unitized loader for inserting cargo into a truck, railroad car, or other large hauling vehicle, comprising:
(a) a structural framework defining a load-bearing surface of suitable size to at least partially enter said hauling vehicle, the framework having fluid bearings mounted on its top side and on its bottom side for floating cargo on the loader and floating the loader on the floor, respectively;
(b) a pusher movably connected to said framework for travel over the top side fluid bearings to push said cargo;
(c) means for moving the loader into an extended position at least partially entering the hauling vehicle to discharge cargo and into a retracted position outside of the vehicle;
(d) means for energizing said top and bottom side fluid bearings;
(e) means for moving said pusher along the load-bearing surface; and
(f) wherein said means for moving the loader comprises a belt and chain system supported by guides mounted in front of and to the rear of the bottom side fluid bearings, the belt and chain being connected for coordinated movement by loader drive means acting on the chain in a first direction to extend the loader and in a second and opposite direction to retract the loader, motion in the first direction drawing the belt around said front guide and under the loader into a pathway for the bottom side fluid bearings.

14. The unitized loader of claim 13, wherein said belt and chain have first ends connected together in a junction moveable with respect to the floor under the loader and second ends connected to the floor and stationary with respect thereto, said loader drive means acting on the chain to cause motion of the moveable junction with respect to the loader, and said stationary floor connection providing control of loader float and alignment during loader movement.

15. The unitized loader of claim 13, wherein said front guide for the belt and chain system comprises an articulating roller connected to said structural framework by a cantilevered means, the action of the belt around the roller urging the roller against the floor, guiding the belt under the bottom side fluid bearings at proper level for bearing operation regardless of the degree of bearing lift.

* * * * *